United States Patent
Yi et al.

(10) Patent No.: US 11,086,468 B2
(45) Date of Patent: Aug. 10, 2021

(54) TOUCH DEVICE, DISPLAY DEVICE AND METHOD FOR MANUFACTURING THE TOUCH DEVICE

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Lixiang Yi, Beijing (CN); Hongqiang Luo, Beijing (CN); Kwanggyun Jang, Beijing (CN); Feng Xiao, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/825,392

(22) Filed: Mar. 20, 2020

(65) Prior Publication Data
US 2021/0026474 A1 Jan. 28, 2021

(30) Foreign Application Priority Data
Jul. 25, 2019 (CN) .......................... 201910677034.7

(51) Int. Cl.
*G06F 3/047* (2006.01)
(52) U.S. Cl.
CPC .... *G06F 3/047* (2013.01); *G06F 2203/04103* (2013.01); *G06F 2203/04112* (2013.01)

(58) Field of Classification Search
CPC .......... G06F 3/047; G06F 2203/04103; G06F 2203/04112; G06F 3/04164; G06F 3/041
See application file for complete search history.

(56) References Cited

U.S. PATENT DOCUMENTS

| | | | |
|---|---|---|---|
| 9,018,716 B1 * | 4/2015 | Chou | H01L 23/60 257/415 |
| 10,481,729 B2 * | 11/2019 | Park | G02F 1/1345 |
| 10,506,693 B2 * | 12/2019 | Fang | G06F 3/041 |
| 10,768,765 B2 * | 9/2020 | Yen | G06F 3/04164 |
| 10,834,815 B2 * | 11/2020 | Kogawa | H05K 1/0296 |
| 2009/0267916 A1 * | 10/2009 | Hotelling | G06F 3/0443 345/174 |
| 2010/0328248 A1 * | 12/2010 | Mozdzyn | G06F 3/0445 345/174 |
| 2014/0210768 A1 * | 7/2014 | Badaye | G06F 3/04164 345/174 |

(Continued)

*Primary Examiner* — Bryan Earles
(74) *Attorney, Agent, or Firm* — Kinney & Lange, P.A.

(57) ABSTRACT

A touch device includes a base; a first peripheral wire, a second peripheral wire, a third peripheral wire, a first shield wire and a second shield wire are disposed on the base; there is a first potential difference between the first peripheral wire and the second peripheral wire, and there is a second potential difference between the second peripheral wire and the third peripheral wire. The second peripheral wire is disposed between and spaced from the first peripheral wire and the third peripheral wire. The first shield wire is discontinuously disposed between the first peripheral wire and the second peripheral wire. The second shield wire is discontinuously disposed between the second peripheral wire and the third peripheral wire.

16 Claims, 5 Drawing Sheets

(56) References Cited

U.S. PATENT DOCUMENTS

2014/0226086 A1\* 8/2014 Chu .................. G06F 3/04164
349/12
2020/0110499 A1\* 4/2020 Lee ........................ G06F 3/044

\* cited by examiner

Fig. 9 patterning the indium tin oxide layer, and etching the indium tin oxide layer and the first metal material layer to the base by using an etching process, to form the ground wire, the signal protection wire, the touch signal receiving wire, the first shield wire and the second shield wire simultaneously — 5031

Fig. 10

TOUCH DEVICE, DISPLAY DEVICE AND METHOD FOR MANUFACTURING THE TOUCH DEVICE

CROSS-REFERENCE TO RELATED APPLICATION

This application claims a priority to Chinese Patent Application No. 201910677034.7 filed on Jul. 25, 2019, the disclosure of which is incorporated in its entirety by reference herein.

TECHNICAL FIELD

The present disclosure relates to the field of touch display technologies, in particular to a touch device, a display device and a method for manufacturing the touch device.

BACKGROUND

With continuous development of electronic technology, a human-computer interaction has been used in more and more display devices to enable a user to operate the display devices. At present, the human-computer interaction has evolved from a mechanical key mode to a touch sensing mode. A touch screen provides the user with the touch sensing mode, therefore its reliability determines a quality of entire display device. A touch sensor is an important component in the touch screen. A defect in the touch sensor would affect touch effect of the entire touch screen.

A short-circuit defect is a common defect in the touch sensor. Especially when an environmental reliability evaluation is performed on a product having a special stack-up structure, the short-circuit defect is more prone to occur. For example, when an 8585 operation evaluation test is performed on a touch sensor of a POL Direct Transfer (PDT) structure or a No Substrate Touch (NST) structure, under a combined effect of water vapor, potential difference and high temperature, short-circuit defects easily occur between a ground wire (GND) and a signal protection wire (Guard) and between the Guard and a touch signal receiving wire (Rx) of peripheral wires of the touch sensor.

SUMMARY

A touch device is provided in the present disclosure. The touch device includes a base, wherein a first peripheral wire, a second peripheral wire, a third peripheral wire, a first shield wire and a second shield wire are disposed on the base; there is a first potential difference between the first peripheral wire and the second peripheral wire, and there is a second potential difference between the second peripheral wire and the third peripheral wire; and wherein the second peripheral wire is disposed between and spaced from the first peripheral wire and the third peripheral wire;

the first shield wire is discontinuously disposed between the first peripheral wire and the second peripheral wire; and the second shield wire is discontinuously disposed between the second peripheral wire and the third peripheral wire.

Further, the first peripheral wire is a ground wire, the second peripheral wire is a signal protection wire, and the third peripheral wire is a touch signal receiving wire.

Further, there is a first distance between the first shield wire and the ground wire; there is a second distance between the first shield wire and the signal protection wire; and the first distance and the second distance are equal.

Further, there is a third distance between the second shield wire and the signal protection wire; there is a fourth distance between the second shield wire and the touch signal receiving wire; and the third distance and the fourth distance are equal.

Further, the first shield wire includes a plurality of first shield sub-wires, and the plurality of first shield sub-wires have a same length; and spacings between two adjacent first shield sub-wires among the plurality of first shield sub-wires are the same.

Further, a length of a first shield sub-wire ranges from 35 µm to 50 µm; and the spacings between two adjacent first shield sub-wires do not exceed 10 µm.

Further, the second shield wire includes a plurality of second shield sub-wires, and the plurality of second shield sub-wires have a same length; and spacings between two adjacent second shield sub-wires among the plurality of second shield sub-wires are the same.

Further, a length of a second shield sub-wire ranges from 35 µm to 50 m; and the spacings between two adjacent second shield sub-wires do not exceed 10 µm.

Further, a width of the first shield wire ranges from 5 µm to 5.5 µm and a width of the second shield wire ranges from 5 µm to 5.5 µm.

Further, the ground wire, the signal protection wire, the touch signal receiving wire, the first shield wire and the second shield wire are made of a same material, the material includes silver alloy or copper alloy; and the ground wire, the signal protection wire, the touch signal receiving wire, the first shield wire and the second shield wire have a same thickness.

Further, the ground wire, the signal protection wire, the touch signal receiving wire, the first shield wire and the second shield wire have a same wire stack-up structure.

A display device including the touch device described above is further provided in the present disclosure.

A method for manufacturing the touch device is further provided in the present disclosure, including:

providing a base;

forming a metal material layer of a predetermined thickness on the base; and patterning the metal material layer to form the first peripheral wire, the second peripheral wire, the third peripheral wire, the first shield wire and the second shield wire simultaneously.

Further, the first peripheral wire is a ground wire, the second peripheral wire is a signal protection wire, and the third peripheral wire is a touch signal receiving wire.

Further, the forming the metal material layer of the predetermined thickness on the base includes:

forming a first metal material layer on the base by sputtering according to a first predetermined thickness; and sputtering indium tin oxide on the first metal material layer according to a second predetermined thickness to form an indium tin oxide layer.

Further, the patterning the metal material layer to form the first peripheral wire, the second peripheral wire, the third peripheral wire, the first shield wire and the second shield wire simultaneously includes:

patterning the indium tin oxide layer, and etching the indium tin oxide layer and the first metal material layer to the base by using an etching process to form the first peripheral wire, the second peripheral wire, the third peripheral wire, the first shield wire and the second shield wire simultaneously.

DETAILED DESCRIPTION

In order to make objectives, features and advantages of the present disclosure clearer, a detailed description will be given below with reference to the accompanying drawings and specific embodiments.

In the related art, peripheral wires of a touch sensor in a touch screen include a ground wire, a signal protection wire, and a touch signal receiving wire. A short-circuit defect is prone to occur between the ground wire and the signal protection wire and is prone to occur between the signal protection wire and the touch signal receiving wire under a combined effect of water vapor, potential difference, and high temperature in an operation evaluation test.

In order to solve the above problem, a touch device is provided in an embodiment of the present disclosure, the touch device includes a base; a first peripheral wire, a second peripheral wire, a third peripheral wire, a first shield wire and a second shield wire are disposed on the base; there is a first potential difference between the first peripheral wire and the second peripheral wire, and there is a second potential difference between the second peripheral wire and the third peripheral wire; the second peripheral wire is disposed between and spaced from the first peripheral wire and the third peripheral wire; the first shield wire is discontinuously disposed between the first peripheral wire and the second peripheral wire; and the second shield wire is discontinuously disposed between the second peripheral wire and the third peripheral wire.

In some embodiments, the first peripheral wire may be a ground wire 101, the second peripheral wire may be a signal protection wire 102, and the third peripheral wire may be a touch signal receiving wire 103.

Since there is the first potential difference between the first peripheral wire and the second peripheral wire, and there is the second potential difference between the second peripheral wire and the third peripheral wire, the first potential difference and the second potential difference may be the same or different, which is not limited in the present disclosure, a short-circuit defect is prone to occur between the first peripheral wire and the second peripheral wire, and between the second peripheral wire and the third peripheral wire under a combined effect of water vapor, potential difference, and high temperature in an operation evaluation test.

In order to solve the above problem, in the embodiments of the present disclosure, the first shield wire is provided between the first peripheral wire and the second peripheral wire, and the second shield wire is provided between the second peripheral wire and the third peripheral wire, so as to solve the problem that the short-circuit defects are prone to occur between the first peripheral wire and the second peripheral wire, and between the second peripheral wire and the third peripheral wire. The first shield wire and the second shield wire are disposed discontinuously to prevent a short-circuit defect occurring at two ends of the first shield wire or the second shield wire from affecting a function of other areas of the first shield wire or the second shield wire.

Figure 1:
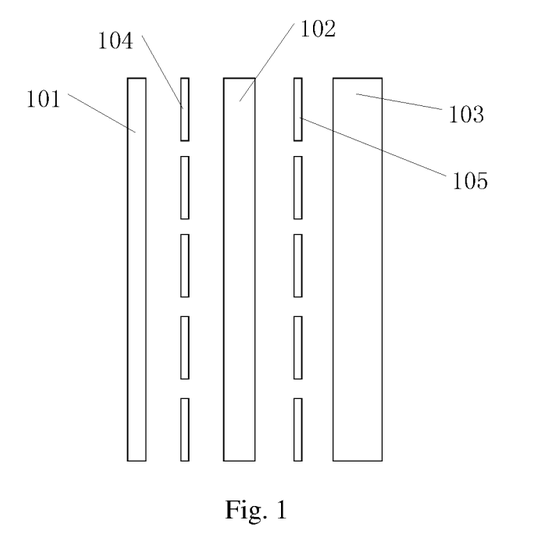
FIG. 1 is a schematic structural diagram of a touch device in an embodiment of the present disclosure.

FIG. 1 is a schematic structural diagram of a touch device in an embodiment of the present disclosure. Referring to the schematic diagram of the touch device as shown in FIG. 1, the touch device includes a base on which the ground wire 101, the signal protection wire 102, the touch signal receiving wire 103, a first shield wire 104 and a second shield wire 105 are disposed; the signal protection wire 102 is disposed between and spaced from the ground wire 101 and the touch signal receiving wire 103; the first shield wire 104 is discontinuously disposed between the ground wire 101 and the signal protection wire 102; and the second shield wire 105 is discontinuously disposed between the signal protection wire 102 and the touch signal receiving wire 103.

In the embodiment of the present disclosure, the first shield wire is provided between the ground wire and the signal protection wire, and the second shield wire is provided between the signal protection wire and the touch signal receiving wire, so as to solve the problem that the short-circuit defects are prone to occur between the ground wire and the signal protection wire, and between the signal protection wire and the touch signal receiving wire. The first shield wire and the second shield wire are disposed discontinuously to prevent a short-circuit defect occurring at two ends of the first shield wire or the second shield wire from affecting a function of other areas of the first shield wire or the second shield wire.

In a specific embodiment, a high potential difference exists between the ground wire and the signal protection wire, and metal particles dissociated from the signal protection wire may migrate along a direction from the signal protection wire toward the ground wire, thereby causing the short-circuit defect. The first shield wire is disposed discontinuously between the ground wire and the signal protection wire to block the migration of the metal particles, thereby mitigating the technical problem that the short-circuit defect occurs between the ground wire and the signal protection wire. The first shield wire is disposed discontinuously, so that even if the short-circuit defect occurs at two ends of the first shield wire, other sections of the first shield wire may still mitigate the short-circuit defect occurring between the ground wire and the signal protection wire.

As an example, there is a first distance between the first shield wire and the ground wire; there is a second distance between the first shield wire and the signal protection wire; and the first distance and the second distance are equal.

In the embodiment of the present disclosure, the distance between the first shield wire and the ground wire and the distance between the first shield wire and the signal protection wire are set to be equal, so that an effect of blocking a migration of metal particles from the ground wire to the signal protection wire is the same as an effect of blocking a migration of metal particles from the signal protection wire to the ground wire.

It should be appreciated that the first distance between the first shield wire and the ground wire and the second distance between the first shield wire and the signal protection wire may also be set to be different, however, effects of blocking metal particle migrations in different directions are different.

As another example, there is a third distance between the second shield wire and the signal protection wire; there is a fourth distance between the second shield wire and the touch signal receiving wire, and the third distance and the fourth distance are equal.

In the embodiment of the present disclosure, the distance between the second shield wire and the signal protection wire, and the distance between the second shield wire and the touch signal receiving wire are set to be equal, so that an effect of blocking a migration of metal particles from the signal protection wire to the touch signal receiving wire is the same as an effect of blocking a migration of metal particles from the touch signal receiving wire to the signal protection wire.

It should be appreciated that the third distance between the second shield wire and the signal protection wire and the fourth distance between the second shield wire and the touch signal receiving wire may also be set to be different, however, effects of blocking metal particle migrations in different directions are different.

Figure 2:
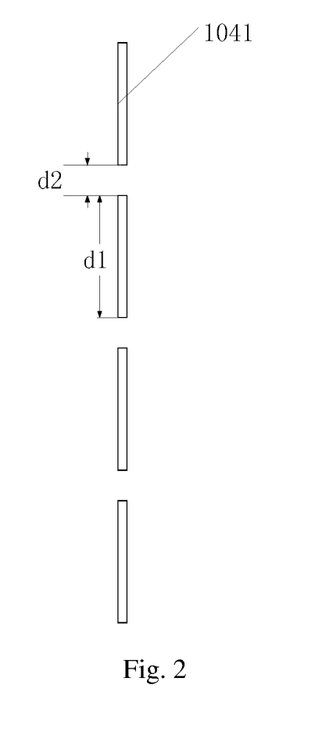
FIG. 2 is a schematic structural diagram of a first shield wire in an embodiment of the present disclosure.

Optionally, referring to FIG. 2, the first shield wire includes a plurality of first shield sub-wires 1041, and the plurality of first shield sub-wires have a same length d1; and spacings d2 between two adjacent first shield sub-wires of the first shield wire are the same.

In the embodiment of the present disclosure, the plurality of first shield sub-wires 1041 are set to have the same length to simplify a forming process of the first shield wire. It should be appreciated that, in the case that there is no need to simplify the forming process of the first shield wire, the first shield sub-wires may also be set to have different lengths. In order to block a migration of metal particles at a defect, the length of the first shield sub-wire should exceed a length of a short-circuit site caused by the defect.

Similarly, the spacings between two adjacent first shield sub-wires are set to be the same to simplify the forming process too. It should be appreciated that, in the case that there is no need to simplify the forming process of the first shield wire, the spacings between two adjacent first shield sub-wires may also be set to be different. The spacings between two adjacent first shield sub-wires should be set to be smaller than the length of the short-circuit point, so that the first shield wire may mitigate the short-circuit defect.

Further, a length of a first shield sub-wire ranges from 35 μm to 50 μm; and the spacings between two adjacent first shield sub-wires do not exceed 10 μm.

In the embodiment of the present disclosure, the short-circuit point caused by the defect is generally about 10 μm in length. By setting a length of the first shield wire to be in the range of 35 μm to 50 μm, the migration of the metal particles can be adequately blocked at the short-circuit defect, thereby avoiding short-circuit. The spacings between two adjacent first shield sub-wires are set to be not larger than 10 μm, which is not enough to cause the short-circuit defect.

Figure 3:
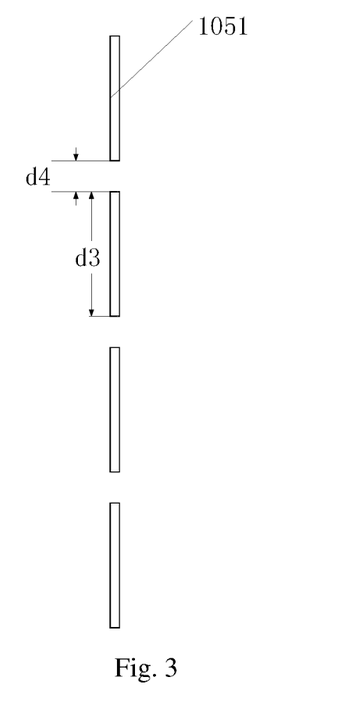
FIG. 3 is a schematic structural diagram of a second shield wire in an embodiment of the present disclosure.

Optionally, referring to FIG. 3, the second shield wire includes a plurality of second shield sub-wires 1051, and the plurality of second shield sub-wires 1051 have a same length d3; spacings d4 between adjacent second shield sub-wires 1051 of the second shield wire are the same.

In the embodiment of the present disclosure, the plurality of second shield sub-wires 1051 are set to have the same length d3 to simplify a forming process of the second shield wire. It should be appreciated that, in the case that there is no need to simplify the forming process of the second shield wire, the second shield sub-wires may also be set to have different lengths. In order to block a migration of metal particles at a defect, the length of the second shield sub-wire should exceed a length of a short-circuit point caused by the defect.

Similarly, the spacings d4 between two adjacent second shield sub-wires are set to be the same to simplify the forming process too. It should be appreciated that, in the case that there is no need to simplify the forming process of the second shield wire, the spacings between two adjacent second shield sub-wires may also be set to be different. The spacings between two adjacent second shield sub-wires should be set to be smaller than the length of the short-circuit point.

Optionally, a length of a second shield sub-wire ranges from 35 μm to 50 μm; and the spacings between two adjacent second shield sub-wires do not exceed 10 μm.

In the embodiment of the present disclosure, the short-circuit point caused by the defect is generally about 10 μm in length. By setting a length of the second shield wire to be in the range of 35 μm to 50 μm, the migration of the metal particles can be adequately blocked at the short-circuit defect, thereby avoiding short-circuit. The spacings between two adjacent second shield sub-wires are set to be not larger than 10 μm, which is not enough to cause the short-circuit defect.

Optionally, a width of the first shield wire ranges from 5 μm to 5.5 μm and a width of the second shield wire ranges from 5 μm to 5.5 μm.

Figure 4:
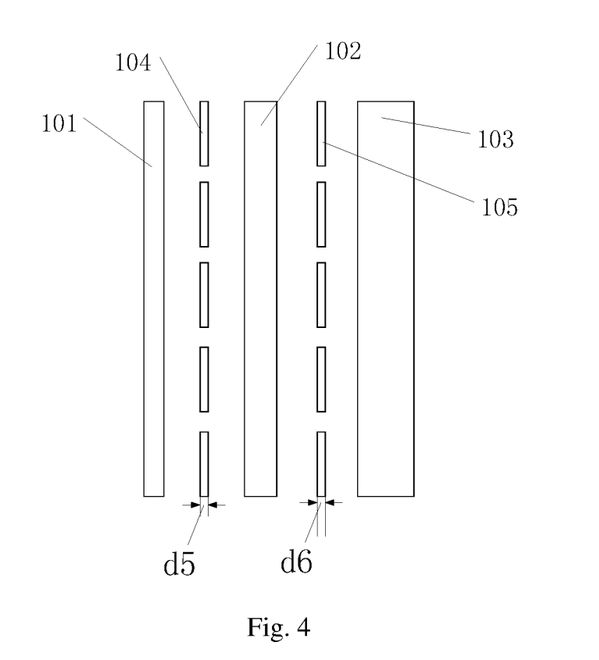
FIG. 4 is a schematic diagram labeling widths of a first shield wire and a second shield wire in a touch device structure in an embodiment of the present disclosure.

In the embodiment of the present disclosure, referring to FIG. 4, the width of the first shield wire 104 is d5, the width of the second shield wire 105 is d6, and both d5 and d6 are in the range from 4.5 μm to 5.5 μm. The first shield wire 104 and the second shield wire 105 may be set to have a same width or different widths, which is not limited in the embodiments of the present disclosure, as long as the widths of the first shield wire and the second shield wire may be realized in conventional forming processes and the first shield wire and the second shield wire of the widths may implement the function of mitigating the short-circuit defect. The width of the shield wire formed in conventional forming processes is not less than 5 μm. The widths of the first shield wire and the second shield wire are set to be in the range from 5 μm to 5.5 μm in this embodiment, so as to solve the aforementioned short-circuit defect while increasing a margin of the touch device as few as possible.

As a specific embodiment, the first shield wire and the second shield wire are set to have different widths, the width of the first shield wire is 5.1 μm, and the width of the second shield wire is 5.2 μm.

As another specific embodiment, the first shield wire and the second shield wire are set to have the same width, the widths of both the first shield wire and the second shield wire are 5.0 μm.

Optionally, the ground wire, the signal protection wire, the touch signal receiving wire, the first shield wire and the second shield wire are made of a same material, the material includes silver alloy or copper alloy; and the ground wire, the signal protection wire, the touch signal receiving wire, the first shield wire and the second shield wire have a same thickness.

In the embodiment of the present disclosure, the material and the thickness of the first shield wire and the second shield wire are the same as the material and the thickness of the ground wire, the signal protection wire, and the touch signal receiving wire, thus a uniformity between the material and the thickness of the first shield wire and the second shield wire and the material and the thickness of the ground wire, the signal protection wire and the touch signal receiving wire is ensured while solving the short-circuit defect, such that the first shield wire, the second shield wire, the ground wire, the signal protection wire and the touch signal receiving wire may be formed simultaneously without adding a new mask and a new forming process. As a result, material costs and device investments are not increased.

In a specific embodiment, the first shield wire and the second shield wire are made of copper alloy, and the ground wire, the signal protection wire, and the touch signal receiving wire are also made of copper alloy.

Optionally, the ground wire, the signal protection wire, the touch signal receiving wire, the first shield wire and the second shield wire have a same wire stack-up structure.

In the embodiments of the present disclosure, the wire stack-up structure includes a single-layer structure and a multi-layer structure. When the wire stack-up structure is a single-layer structure, the wire stack-up structure is a single layer of metal, such as a single layer of silver alloy. When the wire stack-up structure is the multi-layer structure, the wire stack-up structure is a stack-up of metal and indium tin oxide (ITO), such as a stack-up of copper alloy and ITO.

In the embodiment of the present disclosure, the ground wire, the signal protection wire, the touch signal receiving wire, the first shield wire and the second shield wire are set to have the same wire stack-up structure, such that the short-circuit defect of the touch sensor may be solved without adding a new mask and a new forming process. As a result, material costs and device investments are not increased.

A display device is further provided in an embodiment of the present disclosure, the display device includes the touch device. The touch device includes a base; a first peripheral wire, a second peripheral wire, a third peripheral wire, a first shield wire and a second shield wire are disposed on the base; there is a first potential difference between the first peripheral wire and the second peripheral wire, and there is a second potential difference between the second peripheral wire and the third peripheral wire; the second peripheral wire is disposed between and spaced from the first peripheral wire and the third peripheral wire; the first shield wire is discontinuously disposed between the first peripheral wire and the second peripheral wire; and the second shield wire is discontinuously disposed between the second peripheral wire and the third peripheral wire.

In the embodiment of the present disclosure, since the display device includes the touch device, in the display device, the first shield wire is provided between the first peripheral wire and the second peripheral wire to mitigate the short-circuit defect occurring between the first peripheral wire and the second peripheral wire; and the second shield wire is provided between the second peripheral wire and the third peripheral wire to mitigate the short-circuit defect occurring between the second peripheral wire and the third peripheral wire. And the short-circuit defect may be mitigated without incurring additional cost.

Figure 5:
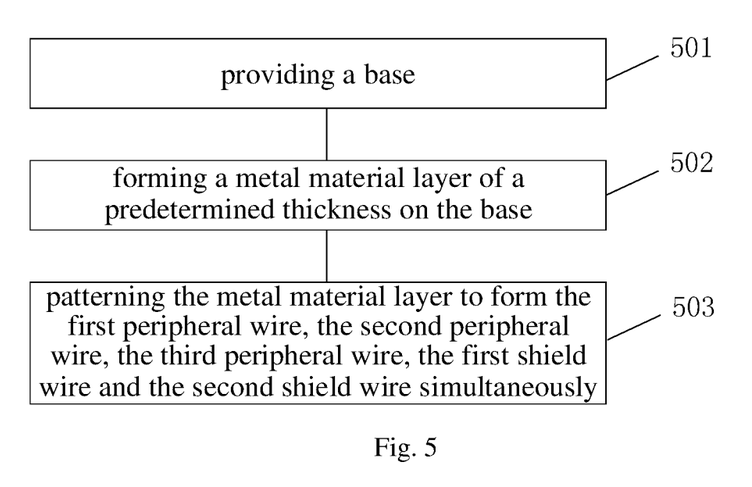
FIG. 5 is a flow chart illustrating a method for manufacturing a touch device in an embodiment of the present disclosure.

Referring to FIG. 5, a method for manufacturing the touch device is provided in an embodiment of the present disclosure, and the method includes the following steps.

Figure 6:
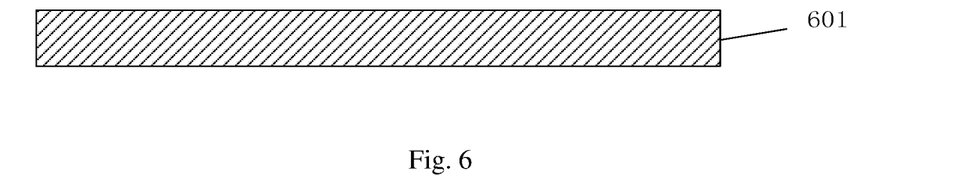
FIG. 6 is a schematic diagram of a base of a touch device in an embodiment of the present disclosure.

Referring to FIG. 6, a step 501 includes: providing a base 601.

In the embodiment of the present disclosure, the base 601 is made of a cycloolefin polymer (cop). The base serves as a foundation for subsequent wiring.

Figure 7:
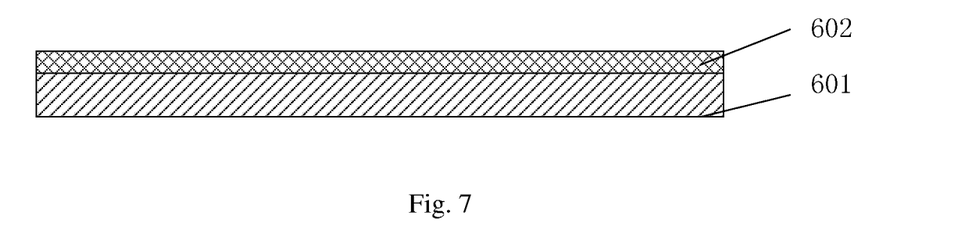
FIG. 7 is a schematic structural diagram illustrating forming a metal material layer on a base in an embodiment of the present disclosure.

Referring to FIG. 7, a step 502 includes: forming a metal material layer 602 of a predetermined thickness on the base 601.

In the embodiment of the present disclosure, a thickness of the metal material layer 602 is determined according to a thickness of the wires, and the metal material layer is made of copper alloy or silver alloy. The thickness of the wires is set differently according to different touch devices. In a specific example, the thickness of the wires is 10 μm. The material of the metal material layer may also be set differently according to different touch devices. In a specific embodiment, the metal material layer is made of silver alloy.

A step 503 includes: patterning the metal material layer to form the first peripheral wire, the second peripheral wire, the third peripheral wire, the first shield wire and the second shield wire simultaneously.

Figure 8:
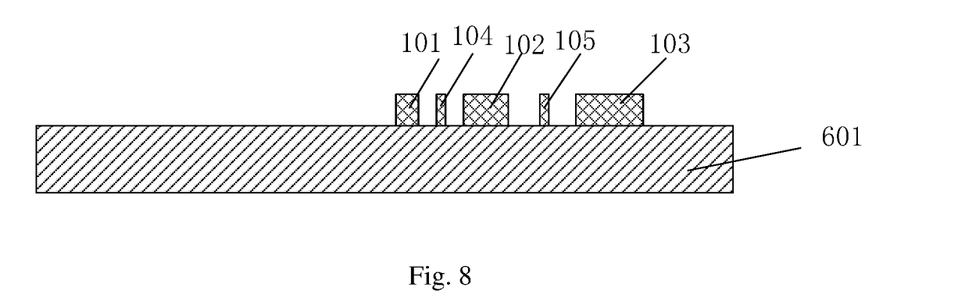
FIG. 8 is a schematic structural diagram of a touch device in an embodiment of the present disclosure.

In some embodiments, the first peripheral wire may be a ground wire 101, the second peripheral wire may be a signal protection wire 102, and the third peripheral wire may be a touch signal receiving wire 103. Referring to FIG. 8, the step 503 specifically includes: patterning the metal material layer to form the ground wire 101, the signal protection wire 102, the touch signal receiving wire 103, the first shield wire 104 and the second shield wire 105 simultaneously.

In some embodiments of the present disclosure, the ground wire 101, the signal protection wire 102, the touch signal receiving wire 103, the first shield wire 104, and the second shield wire 105 are formed simultaneously after being patterned, where the first shield wire 104 and the second shield wire 105 are used to mitigate the problem that short-circuits are prone to occur between the ground wire 101 and the signal protection wire 102 and between the signal protection wire 102 and the touch signal receiving wire 103. The first shield wire 104 and the second shield wire 105 are disposed discontinuously to prevent a short-circuit defect occurring in a local area from affecting a function of other areas of the first shield wire 104 or the second shield wire 105.

In the embodiment of the present disclosure, the material of the first shield wire and the second shield wire is the same as the material of the ground wire, the signal protection wire, and the touch signal receiving wire, thus a uniformity between the material of the shield wires and the material of the ground wire, the signal protection wire and the touch signal receiving wire is ensured while solving the short-circuit defect, such that the first shield wire, the second shield wire, the ground wire, the signal protection wire and the touch signal receiving wire may be formed simultaneously without adding a new mask and a new forming process. As a result, material costs and device investments are not increased.

Figure 9:
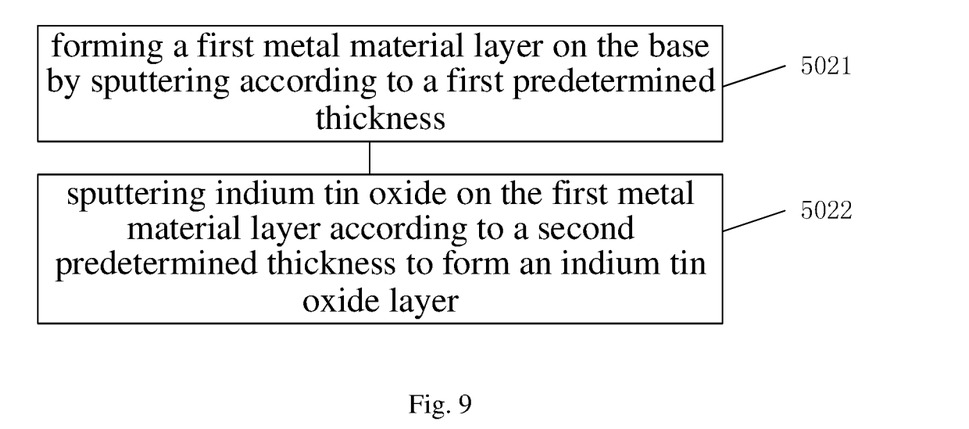
FIG. 9 is a flow chart illustrating sub-steps of a method for manufacturing a touch device in an embodiment of the present disclosure.

Optionally, referring to FIG. 9, the step 502 includes following steps.

A step 5021 includes: forming a first metal material layer on the base by sputtering according to a first predetermined thickness.

In the embodiment of the present disclosure, the first metal material may include silver oxide or copper oxide. The first predetermined thickness is determined according to the thickness of the wires, and the thickness of the wires is set differently according to different touch devices.

A step 5022 includes: sputtering indium tin oxide on the first metal material layer according to a second predetermined thickness to form an indium tin oxide layer.

In the embodiment of the present disclosure, the second predetermined thickness is also determined according to the thickness of the wires, and the thickness of the wires is set differently according to different touch devices. The indium tin oxide is sputtered on the first metal material layer according to the second predetermined thickness to form the indium tin oxide layer, and the indium tin oxide layer and the first metal material layer together form the metal material layer. The metal material layer is etched to form the ground wire, the signal protection wire, the touch signal receiving wire, the first shield wire and the second shield wire.

Figure 10:
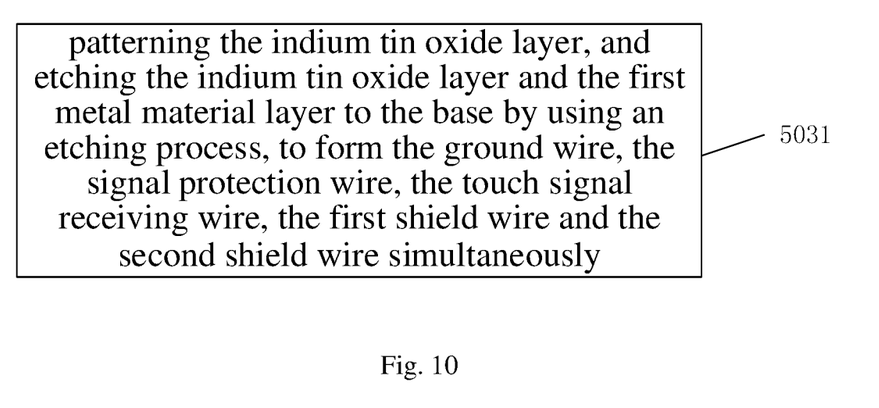
FIG. 10 is a flow chart illustrating a sub-step of a method for manufacturing a touch device in an embodiment of the present disclosure.

Optionally, referring to FIG. 10, the step 503 includes a step 5031, which includes: patterning the indium tin oxide layer, and etching the indium tin oxide layer and the first metal material layer to the base by using an etching process, to form the ground wire, the signal protection wire, the touch signal receiving wire, the first shield wire and the second shield wire simultaneously.

In the embodiment of the present disclosure, patterning the indium tin oxide layer includes: applying a photoresist on the indium tin oxide layer, covering the photoresist-applied indium tin oxide layer with a pre-formed mask and exposing, and after the exposure is completed, removing the photoresist by etching with a specific reagent to obtain the patterned indium tin oxide layer. Then, the patterned indium tin oxide layer is etched to the base to form the ground wire, the signal protection wire, the touch signal receiving wire, the first shield wire and the second shield wire simultaneously.

In the embodiment of the present disclosure, the material of the first shield wire and the second shield wire is the same as the material of the ground wire, signal protection wire, and touch signal receiving wire, thus a uniformity between the thickness and material of the shield wires and the thickness and material of the ground wire, the signal protection wire and the touch signal receiving wire is ensured while solving the short-circuit defect, such that the ground wire, the signal protection wire, the touch signal receiving wire, the first shield wire and the second shield wire may be formed simultaneously without adding a new mask and a new forming process. As a result, material costs and device investments are not increased.

The foregoing method embodiments are described as a combination of a series of operations for the sake of simplicity in description, but those skilled in the art should know that the present disclosure is not limited by the described order of operations in that some steps may be performed in another order or simultaneously according to the present disclosure. Moreover, those skilled in the art should also know that the embodiments described in the specification are optional, and the operations and modules involved are not necessarily required by the present disclosure.

Each embodiment in the specification is described in a progressive manner and focuses on the differences from other embodiments. For the description of same or similar parts between various embodiments, a cross-reference may be made to the embodiments.

Finally, it should be noted that in the present disclosure, relational terms such as first and second are used only to distinguish one entity or operation from another entity or operation, and do not necessarily require or imply that there is any such actual relationship or order between the entities or operations. Moreover, a term "include", "have" or any other variation thereof are intended to encompass non-exclusive inclusion, such that a process, method, product or device including a series of elements includes not only those elements, but also other elements not explicitly listed, or elements inherent to the process, method, product or device. Without more restrictions, an element defined by an expression "including a . . . " does not exclude the existence of other identical elements in the process, method, product or device including the element.

The touch device, the display device, and the method for manufacturing the touch device provided in the present disclosure are described in detail above. Specific examples are used herein to explain the principle and implementation of the present disclosure. The description of the above embodiments is only meant to facilitate the understanding of the method of the present disclosure and its core ideas; and modifications may be made in the specific implementations and applications by a person of ordinary skill in the art according to the ideas of the present disclosure. Therefore, the contents of the description should not be construed as a limitation of the present disclosure.

What is claimed is:

1. A touch device, comprising a base, wherein a first peripheral wire, a second peripheral wire, a third peripheral wire, a first shield wire and a second shield wire are disposed on the base; there is a first potential difference between the first peripheral wire and the second peripheral wire, and there is a second potential difference between the second peripheral wire and the third peripheral wire; and wherein:
the second peripheral wire is disposed between and spaced from the first peripheral wire and the third peripheral wire;
the first shield wire is discontinuously disposed between the first peripheral wire and the second peripheral wire; and
the second shield wire is discontinuously disposed between the second peripheral wire and the third peripheral wire.

2. The touch device according to claim 1, wherein the first peripheral wire is a ground wire, the second peripheral wire is a signal protection wire, and the third peripheral wire is a touch signal receiving wire.

3. The touch device according to claim 2, wherein there is a first distance between the first shield wire and the ground wire; there is a second distance between the first shield wire and the signal protection wire; and the first distance and the second distance are equal.

4. The touch device according to claim 2, wherein there is a third distance between the second shield wire and the signal protection wire; there is a fourth distance between the second shield wire and the touch signal receiving wire; and the third distance and the fourth distance are equal.

5. The touch device according to claim 1, wherein the first shield wire comprises a plurality of first shield sub-wires, and the plurality of first shield sub-wires have a same length; and wherein:
spacings between two adjacent first shield sub-wires among the plurality of first shield sub-wires are the same.

6. The touch device according to claim 5, wherein a length of the first shield sub-wire ranges from 35 μm to 50 μm; and wherein:
the spacings between two adjacent first shield sub-wires do not exceed 10 μm.

7. The touch device according to claim 1, wherein the second shield wire comprises a plurality of second shield sub-wires, and the plurality of second shield sub-wires have a same length; and wherein:

spacings between two adjacent second shield sub-wires among the plurality of second shield sub-wires are the same.

8. The touch device according to claim 7, wherein a length of the second shield sub-wire ranges from 35 μm to 50 μm; and wherein:

the spacings between two adjacent second shield sub-wires do not exceed 10 μm.

9. The touch device according to claim 1, wherein a width of the first shield wire ranges from 35 μm to 5.5 μm and a width of the second shield wire ranges from 5 μm to 5.5 μm.

10. The touch device according to claim 2, wherein the ground wire, the signal protection wire, the touch signal receiving wire, the first shield wire and the second shield wire are made of a same material, the material comprises silver alloy or copper alloy; and wherein:

the ground wire, the signal protection wire, the touch signal receiving wire, the first shield wire and the second shield wire have a same thickness.

11. The touch device according to claim 2, wherein the ground wire, the signal protection wire, the touch signal receiving wire, the first shield wire and the second shield wire have a same wire stack-up structure.

12. A display device, comprising the touch device according to claim 1.

13. A method for manufacturing the touch device according to claim 1, comprising:

providing a base;

forming a metal material layer of a predetermined thickness on the base; and patterning the metal material layer to form the first peripheral wire, the second peripheral wire, the third peripheral wire, the first shield wire and the second shield wire simultaneously.

14. The method according to claim 13, wherein the first peripheral wire is a ground wire, the second peripheral wire is a signal protection wire, and the third peripheral wire is a touch signal receiving wire.

15. The method according to claim 14, wherein the forming the metal material layer of the predetermined thickness on the base comprises:

forming a first metal material layer on the base by sputtering according to a first predetermined thickness; and sputtering indium tin oxide on the first metal material layer according to a second predetermined thickness to form an indium tin oxide layer.

16. The method according to claim 15, wherein the patterning the metal material layer to form the first peripheral wire, the second peripheral wire, the third peripheral wire, the first shield wire and the second shield wire simultaneously comprises:

patterning the indium tin oxide layer, and etching the indium tin oxide layer and the first metal material layer to the base by using an etching process to form the first peripheral wire, the second peripheral wire, the third peripheral wire, the first shield wire and the second shield wire simultaneously.

* * * * *